United States Patent [19]

Gordon et al.

[11] Patent Number: 4,790,944
[45] Date of Patent: Dec. 13, 1988

[54] PROCESS AND APPARATUS FOR THE SEPARATION OF FOREIGN MATTER FROM A LIQUID BY FLOTATION

[75] Inventors: Iain C. Gordon, Kempston; Ian Christopher, Stubbington, both of United Kingdom

[73] Assignee: CJB Developments Ltd., London, England

[21] Appl. No.: 29,698

[22] Filed: Mar. 24, 1987

[30] Foreign Application Priority Data

Mar. 27, 1986 [GB] United Kingdom ................ 8607854

[51] Int. Cl.⁴ .......................................... B01D 17/035
[52] U.S. Cl. .................... 210/706; 210/221.2
[58] Field of Search ............... 210/221.2, 706, 703, 210/704, 705, 707, 712, 718, 721; 209/19, 20, 21, 13, 18, 16, 17

[56] References Cited

U.S. PATENT DOCUMENTS 2,730,190  7/1956  Brown et al. .
3,986,954 10/1976  George et al. .................. 210/706
4,627,922 12/1986  Viator et al. .................. 210/221.2

FOREIGN PATENT DOCUMENTS 2539772  4/1984  France .
2519476 10/1984  France .
WO85/04432  8/1985  PCT Int'l Appl. .
2013646A  1/1979  United Kingdom .

OTHER PUBLICATIONS

A. Mathews et al., "Treatment of Oil Contaminated Waste Waters by Foam Fractionation", *Water Research*, vol. 13, No. 4, pp. 385 to 391, (Apr. 1979).

*Primary Examiner*—Frank Sever
*Attorney, Agent, or Firm*—Bacon & Thomas

[57] ABSTRACT

A process for the separation of foreign matter from a liquid, which process comprises mixing a stream of contaminated liquid containing dissolved gas with a stream of induced gas to provide a multi-phase flow, subjecting the multi-phase flow to turbulence and shearing thereby to produce a well dispersed bubbly liquid stream, passing the bubbly liquid stream into a vessel which contains the liquid contaminated with foreign matter, below the free surface of the liquid, and allowing the bubbles of gas to rise to the surface of the liquid, the surface adherence between the gas bubbles and the particles of foreign matter causing the particles of foreign matter to float to the surface of the liquid.

5 Claims, 2 Drawing Sheets

PROCESS AND APPARATUS FOR THE SEPARATION OF FOREIGN MATTER FROM A LIQUID BY FLOTATION

BACKGROUND OF THE INVENTION

The present invention relates to a process and apparatus for the separation of foreign matter from a liquid and, in particular, to a process in which a jet of liquid containing induced gas and dissolved gas is used to effect this separation. The process is particularly directed to the separation of oil and water.

Flotation systems which are available at present for the separation of oil and water are of two main types, namely induced gas flotation and dissolved gas flotation. In the induced gas flotation process, gas is introduced into the liquid using a mechanical device such as a rotating impeller which disperses many small gas bubbles into the liquid. Rising gas bubbles then provide a large gas-liquid interface at which oil and oil-wetted particles are concentrated. These particles rise to the surface with the bubbles and remain in the froth above the water from which they can be efficiently and easily skimmed away. The dissolved gas flotation process involves dissolving gas in water at an increased pressure and introducing the water under pressure into a cell maintained at a lower pressure and containing the liquid to be treated. The pressure drop on introduction of the water under pressure into the cell causes small bubbles of the gas to be released. The gas bubbles rise to the surface of the liquid together with the oil to be removed from the liquid. The oil can then be removed from the liquid surface of the cell by skimming.

International Patent Application No. WO85/04432 discloses a means of inducing air into a fluid travelling through a pipe of varying diameter which is divided into inlet, mixing and draught sections.

"Water Research" vol 13, no 4 (1979) pp 385-391 discloses a method of separating oil contaminants from water using dissolved air flotation with a variety of chemical aids.

The difference between the induced gas and dissolved gas flotation processes is, therefore, the method by which the gas is introduced into the liquid. However, both of these flotation processes require considerable amounts of power and generally the apparatus includes several complex and expensive components. For applications in which either space or weight is at a premium, for example on offshore oil field platforms, these flotation systems are very inefficient in terms of floor area, volume and weight.

We have now developed a new process and apparatus for the separation of foreign matter from a liquid by flotation which overcomes the problems and disadvantages of the induced gas and dissolved gas flotation processes, which has a greatly reduced number of components, occupies less space, weighs less and requires less power.

SUMMARY OF THE INVENTION

Figure 1:
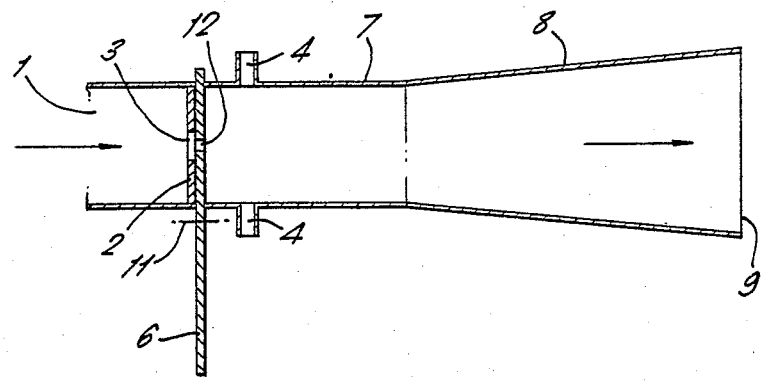
FIG. 1 is a cross-sectional representation of the nozzles of the invention.

Accordingly, in one aspect the present invention provides a process for the separation of foreign matter from a liquid, which process comprises mixing a stream of contaminated liquid containing dissolved gas with a stream of induced gas to provide a multi-phase flow, subjecting the multi-phase flow to turbulence and shearing thereby to produce a well dispersed bubbly liquid stream, passing the bubbly liquid stream into a vessel which contains the liquid contaminated with foreign matter, below the free surface of the liquid, and allowing the bubbles of gas to rise to the surface of the liquid, the surface adherence between the gas bubbles and the particles of foreign matter causing the particles of foreign matter to float to the surface of the liquid.

In carrying out the process of the invention the foreign matter is preferably removed from the surface of the liquid, for example by means of a skimmer. The removal may be continuous or intermittent.

The process of the present invention is particularly adapted for the separation of oil and water and is particularly useful for the removal of oily wastes and suspended solids from waste water in the petroleum industry, such as oil field production water, refinery process water and waste water created in the production of chemicals from natural gas or petroleum. The process of the present invention may also be used, for example, for the processing of chemical and food plant waste effluents prior to biological treatment or discharge, for the removal of organic matter and suspended solids from water, for the treatment of waste water from the paper making industry, and in the mineral and metallurgical fields.

In the separation of oil from water the liquid stream containing dissolved gas is a stream of the oil contaminated water which is saturated with produced gas. For large systems a plurality of bubbly liquid streams may be passed into the vessel in order to ensure an even flow of the bubbly liquid streams into the contaminated liquid and an even distribution of bubbles.

In carrying out the process of the present invention an adequate amount of gas must be incorporated into the liquid stream as small bubbles in order to provide the required physical contact between the surface of the particles of foreign matter, e.g. oil droplets or suspended solid particles, and the surface of the gas bubbles. Flotation is thus influenced by the collision between bubbles and the particles of foreign matter, the formation of flocs of particles and the adsorption of bubbles onto the particles and the floc structures. The bubble/particle interactions are governed by the surface chemistry of the system and it will be appreciated that on contact these surfaces must adhere rather than be repulsed. This surface characteristic may be enhanced by the use of coagulating agents such as salts of iron, aluminium or calcium, or organic polyelectrolytes.

The bubbly liquid stream is passed into the vessel containing the liquid contaminated with foreign matter below the free surface of the liquid. Preferably the bubbly liquid stream will enter the vessel at one corner or end thereof. A sufficiently large quiescent flotation region is thus provided in the remainder of vessel so that the particles/gas bubbles can rise to the surface of the liquid, thereby to separate the particles of foreign matter from the main body of the liquid. Excessive disturbance in this region could cause separation of the particles/gas bubbles or even the re-emulsification of the particles into the liquid.

A particular advantage of the process of the present invention for treating produced water from oil production wells is that the produced water is under pressure. This eliminates the need for pumping equipment. Furthermore, the produced water on offshore oil production platforms is not only normally under pressure, but also fully saturated with produced gas.

The process of the invention is particularly suited to the separation of oil and saline water, for example on offshore oil production platforms, as the bubbles formed in saline water are small, typically in the range of from 0.2 to 0.8 mm in diameter, and the water temperature is typically in the range of 50° C. to 90° C., these factors producing respectively small bubbles and an increase in the rate at which the bubbles rise to the surface of the water, thereby resulting in a more rapid separation of the oil from the water.

The main advantages of the process of the invention are as follows:

(a) a significant increase in the rate of mass transfer is made possible when compared with that of the known induced gas flotation and dissolved gas flotation processes, (b) the high rate of mass transfer makes it possible to reduce the volume of the reaction vessel significantly, and (c) the process can be carried out in relatively simple equipment.

The present invention also provides, in another aspect, apparatus for the separation of foreign matter from a liquid, which apparatus comprises a vessel to contain the liquid contaminated with foreign matter, the vessel having an inlet for the contaminated liquid, which inlet is at least one nozzle comprising means for mixing a stream of a liquid containing dissolved gas with a stream of induced gas to provide a multi-phase flow and means for subjecting the multi-phase flow to turbulence and shearing thereby, in use, to produce a well dispersed bubbly liquid flow into the vessel, and an outlet for the purified liquid.

In a preferred aspect of the present invention the inlet nozzle projects in the horizontal plane or near to the horizontal plane into the vessel. It is positioned so as to ensure that the greater part of the vessel will be left in a sufficiently quiescent condition to allow the gas bubbles, with particles of foreign matter adhered thereto, to rise readily to the surface of the vessel. The outlet of the vessel is positioned towards the bottom of the vessel for the passage of purified liquid therethrough. The vessel may be equipped with a skimmer or the like to remove foreign matter, such as oil, from the surface of the liquid. The vessel is also preferably equipped with an outlet arrangement in which a baffle prevents the foreign matter approaching the outlet. The purified liquid is passed underneath the baffle and drawn off from the bottom of the vessel.

It may be advantageous to use two apparatuses of the above described type in series so as to improve the efficiency of removal of foreign matter from the contaminated liquid.

The nozzle which produces the bubbly liquid flow into the vessel comprises means for mixing a stream of a liquid containing dissolved gas with a stream of induced gas to provide a multi-phase flow and means for subjecting the multi-phase flow to turbulence and shearing.

In a further aspect the present invention provides a nozzle for the production of a bubbly liquid which comprises a liquid inlet passageway, two adjacent aperture plates mounted in the passageway perpendicular to the axis thereof, at least one of the plates being moveable so that on moving the plates, either singly or together, the total orifice area of the passageway is altered as the aperture overlap is altered, an induced gas inlet, a mixing tube downstream of the induced gas inlet which diverges to the nozzle outlet and means to vary the position(s) of the moveable aperture plate(s) so that the pressure of the liquid flow through the nozzle can be controlled.

The means to vary the position of the moveable aperture plates may be, for example, a sensor positioned upstream thereof which monitors the liquid flow through the liquid inlet passageway. The movement of the plates(s) causes the total orifice area to vary and this controls the presence of the liquid containing dissolved gas. A valve may also be included to vary the flow of induced gas into the nozzle and, if desired, the flow of gas may be controlled by the same sensor which is used to vary the positions of the moveable aperture plate(s).

In a first preferred aspect the present invention provides a nozzle for the production of a bubbly liquid which comprises a liquid inlet passageway, a fixed orifice plate mounted in the passageway perpendicular to the axis thereof, a rotatable plate with a variable orifice mounted immediately adjacent to the fixed orifice plate perpendicular to the axis of the liquid inlet passageway, an induced gas inlet, a mixing tube downstream of the induced gas inlet which diverges to the nozzle outlet and means to vary the position of the revolving orifice plate so that the pressure of the liquid flow through the nozzle can be controlled.

Preferably the orifice in the fixed orifice plate is positioned centrally therein and preferably the variable orifice in the variable orifice plate is an arcuate slot having a varying width. The means to vary the position of the revolving orifice plate may be, for example, a sensor positioned upstream thereof which monitors the liquid flow through the liquid inlet passageway. The rotation of the variable orifice plate causes the actual orifice area to vary and this controls the pressure of the liquid containing dissolved gas on the upstream side of the fixed orifice plate. A valve may also be included to vary the flow of induced gas into the nozzle and, if desired, the flow of gas may be controlled by the same sensor which is used to vary the position of the revolving orifice plate.

In a second preferred aspect, the present invention provides a nozzle for the production of a bubbly liquid which comprises a liquid inlet passageway, two adjacent slidable aperture plates mounted in the passageway perpendicular to the axis thereof so that on sliding the plates either singly or together the total orifice area of the passageway is altered as the aperture overlap is altered, an induced gas inlet, a mixing tube downstream of the induced gas inlet which diverges to the nozzle outlet and means to vary the positions of the aperture plates so that the pressure of the liquid flow through the nozzle can be controlled.

Preferably the apertures in the slide plates are elipses. The means to vary the position of the slidable aperture plates may be, for example, a sensor positioned upstream thereof which monitors the liquid fow through the liquid inlet passageway. The movement of the plates causes the total orifice area to vary and this controls the pressure of the liquid containing dissolved gas. A valve may also be included to vary the flow of induced gas into the nozzle and, if desired, the flow of gas may be controlled by the same sensor which is used to vary the positions of the sliding aperture plate.

The variable area nozzle of the present invention thus enables a constant pressure of liquid containing dissolved gas to be maintained despite a varying flow. The incoming stream of liquid containing dissolved gas, which is passed through the inlet passageway, is under pressure and on offshore oil production platforms this liquid is normally fully saturated with produced gas. As the saturated liquid passes through the orifice plate at the upstream side of the nozzle, the pressure reduces to the pressure of the liquid in the flotation vessel. The pressure drop across the orifice plate will cause much of the produced gas to come out of solution, thus forming small bubbles. Upon passage through the orifice the liquid stream is mixed with a separate gas stream which is produced gas taken from the vessel freeboard, and expands radially as a vena-contracta and passes down the mixing tube as an essentially inverted annular flow regime. In this region the flow impinges against the walls of the mixing tube and the gas is entrained in the liquid so that the multi-phase flow progresses as a well dispersed bubbly liquid. Any reduction in the flow rate to the flotation vessel would result in a reduced pressure drop across the nozzle. On offshore oil production platforms, the downstream pressure is fixed and the reduced pressure drop would therefore occur upstream of the flotation vessel which is at a constant pressure and this would cause a pressure differential upstream of the nozzle. Gas in the inlet liquid stream would therefore be flushed from solution upstream of the nozzle. The presence of the gas would cause pockets of gas to pass through the nozzle and into the main flotation vessel, thus disturbing the quiescent conditions necessary to allow steadily rising bubbles. This problem is overcome by the nozzle of the invention in which the pressure in the inlet liquid stream is maintained constant by means of the revolving orifice plate which has a variable orifice or by means of the sliding orifice plates.

Figure 2:
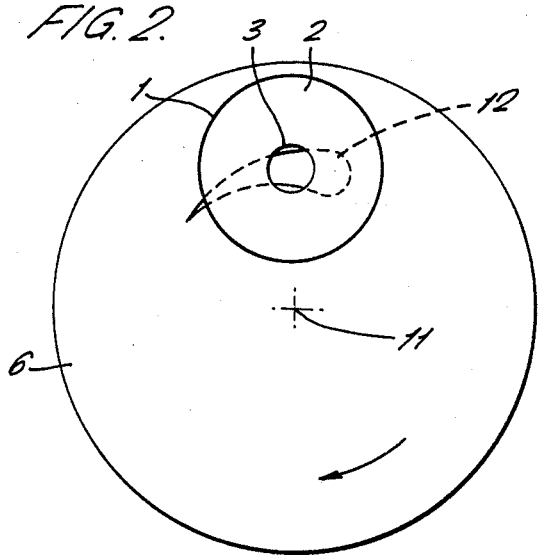
FIG. 2 is an illustration of the rotatable plate with a variable orifice.

The present invention will be further described by way of example and with reference to the accompanying drawings:

Referring to FIGS. 1 and 2 of the drawings, FIG. 1 illustrates, in cross-section, a nozzle of the invention. The nozzle has a liquid inlet passageway 1 through which, for example, water contaminated with oil and containing dissolved gas is passed. This liquid flow meets a plate 2 positioned in the passageway perpendicular to the axis thereof, the plate having a central circular orifice 3 formed therein. The rotatable plate 6 with the variable orifice 12 is mounted immediately downstream of plate 2. An inlet 4 for the flow of induced gas into the nozzle is positioned downstream of the orifice plates. The liquid flow passes through the variable orifice plate and mixes with the gas stream in the mixing tube 7. The mixing tube has divergent walls 8 which terminate in exit 9 of the nozzle. On passage through the fixed orifice plate 2 and the rotatable orifice plate 6 the multi-phase flow expands radially and, in the mixing tube, gas which enters through inlet 4 is entrained in the liquid and the multi-phase flow progresses as a well dispersed bubbly liquid. The bubbly liquid leaves the nozzle via exit 9. The arrows indicate the direction of flow through the nozzle.

Referring to FIG. 2 of the drawings, the rotatable plate 6 rotates about a centre of rotation 11. The plate has an arcuate slot 12 which varies in width along its length. The rotating orifice plate is positioned in such a manner that the arcuate slot 12 is aligned with the circular orifice 3 in the fixed orifice plate 2 as the rotatable plate rotates about the centre of rotation 11. It will be appreciated that as the arcuate slot 12 moves behind the fixed orifice 3, the effective orifice area varies.

Figure 3:
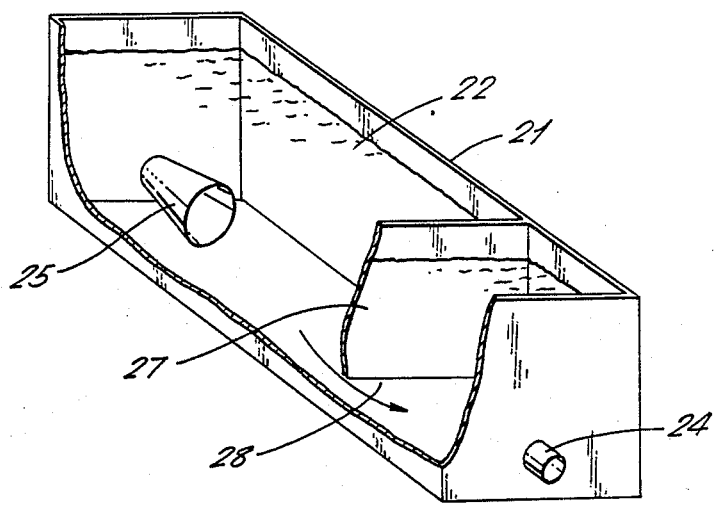
FIG. 3 is an illustration of the apparatus in which foreign matter is separated from a liquid.

Referring to FIG. 3 of the drawings, a vessel 21 which contains a liquid contaminated with foreign matter 22 has an inlet nozzle 25 for the passage of contaminated liquid through the vessel and an outlet 24 through which the purified liquid passes. A gas atmosphere, such as produced gas, is provided above the surface of the contaminated liquid. A jet of bubbly liquid is formed through the nozzle 25 and a dense cloud of bubbles produced by the combined induced gas and dissolved gas spreads across the base of the vessel. The bubbles of gas, with particles of foreign matter adhered thereto rise to the surface of the liquid and form a froth or scum of foreign matter at the surface thereof. The liquid flowing through the vessel encounters a baffle 27 which does not extend in depth fully to the bottom of the vessel and there is a space 28 formed between it and the floor of the vessel. Purified liquid thus leaves the main separation area of vessel 21 via space 28 and leaves the vessel via outlet pipe 24. The froth or scum of foreign matter formed on the surface of the liquid may be removed by means of a skimmer, or the like (not shown).

It will be understood that the apparatus as illustrated in FIG. 3 may be of any desired dimensions, depending upon the quantity of liquid which it is desired to treat.

Figure 4:
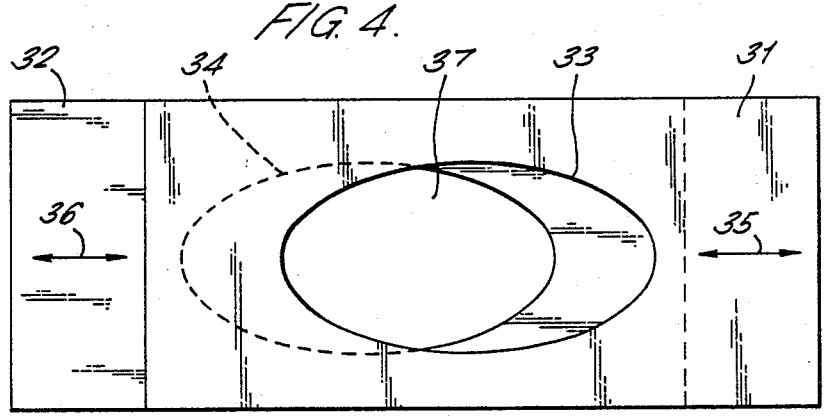
FIG. 4 is an illustration of the slideable aperture plates with a variable orifice.

Referring to FIG. 4 of the drawings, the slideable plates, 31 and 32, slide in the directions shown by the arrows, 35 and 36. The plates each have elliptically shaped apertures, 33 and 34. The plates are positioned in such a manner that the elliptical apertures overlap to form an orifice, 37, whose area may be varied by sliding one or both of the plates.

It will be understood that the slideable aperture plates 31 and 32 of FIG. 4 may take the place of the fixed orifice plate, 2, and rotatable plate, 6, of FIG. 1 in the nozzle illustrated in that figure.

EXAMPLE

The process of the present invention is further illustrated by the following non-limiting Example:

EXAMPLE 1

A rectangular vessel with a total residence time of 4 minutes was filled with 3% saline water maintained at a temperature of 75° C. An amount of 20 ppm of a de-emulsifier was added to the saline water. A single ejector nozzle was positioned at one end of the vessel below the surface of the saline solution. A bubbly liquid saline stream was formed using a nozzle of the type as described with reference to FIGS. 1 and 2 of the accompanying drawings. The dissolved gas used was nitrogen and the induced gas was air. The bubbly liquid saline stream was introduced through the ejector nozzle at a flow rate of 270 l/min. An oil inlet concentration of 240 ppm was reduced to an outlet concentration of 36 ppm.

What is claimed is:

1. A process for the separation of foreign matter from a liquid, which process comprises the steps of:

(a) passing a stream of liquid contaminated with particles of foreign matter and in which gas is dissolved through a variable orifice nozzle and then causing the stream of liquid to mix with a stream of induced gas which is the same as the gas which is dissolved in the liquid, thereby to provide a mult-phase flow;

(b) causing said multi-phase flow to be subjected to turbulence and shearing thereby to produce a well dispersed bubbly liquid stream;

(c) causing said bubbly liquid steam to pass into a vessel which contains said liquid contaminated with particles of foreign matter, said liquid in the vessel having a free surface, and said liquid stream being introduced below said free surface of the liquid in the vessel; and (d) allowing the bubbles of gas in said liquid to rise to said free surface of said liquid, whereby the particles of foreign matter contaminating the liquid are caused to float to said free surface by their surface adhesion to said bubbles of gas.

2. A process according to claim 1 wherein the liquid to be treated is water contaminated with oil.

3. A process according to claim 1 wherein a coagulating agent is added to the liquid contaminated with foreign matter.

4. A process according to claim 1 wherein the liquid containing dissolved gas is the produced water on an offshore oil production platform.

5. A process according to claim 1 wherein the variable orifice nozzle comprises:

(a) a liquid inlet passageway;

(b) two adjacent aperture plates mounted in said passageway perpendicular to the axis thereof, at least one of said plates being moveable, so that on moving the plates either singly or together, the total orifice area of the passageway is altered as the aperture overlap is altered;

(c) an induced gas inlet;

(d) a mixing tube downstream of said induced gas inlet which mixing tube diverges to the nozzle outlet; and (e) means to vary the position(s) of said moveable aperture plates so that the pressure of the liquid flow through said nozzle can be controlled.

* * * * *